United States Patent [19]
Brunette

[11] 3,742,533
[45] July 3, 1973

[54] MULTIPLE-USE TOOL
[76] Inventor: Samuel J. Brunette, Crooked Oak Road, Belle Terre, Port Jefferson, N.Y. 11777
[22] Filed: Jan. 31, 1972
[21] Appl. No.: 222,033

[52] U.S. Cl. .................... 7/1 G, 81/90 D, 145/50 C
[51] Int. Cl. ............................................... B25f 1/00
[58] Field of Search ....................... 7/1 F, 1 G, 1 E, 7/1 R; 145/50 DB, 50 C; 81/90 R, 90 D, 90 E, 90 C, 119, 121 B

[56] References Cited
UNITED STATES PATENTS

| | | | |
|---|---|---|---|
| 1,110,250 | 9/1914 | Boyn | 7/1 G |
| 3,151,512 | 10/1964 | Charczenko | 81/90 D |
| 3,191,649 | 6/1965 | Dzus | 145/50 C |
| 3,276,299 | 10/1966 | Halburian | 7/1 G X |

Primary Examiner—Robert C. Riordon
Assistant Examiner—Roscoe V. Parker
Attorney—William T. Hough et al.

[57] ABSTRACT

A multi-purpose tool which in a preferred embodiment is a flattened member having upper and lower flattened edges of predetermined width, with the lower edge having a groove extending along the edge receivable of a wing nut and of the shaft on which a wing nut would be mounted, and defining a through-space between opposite flattened faces of the tool with one face defining a circular shape around said through-space and having a diameter slightly less than that of a predetermined valve-face of a water-outlet valve of an aircraft gasoline tank such that upward pressure opens the valve whereby water in the bottom of the gas tank is drainable through the through-space of the tool, and an opposite face of the tool defining a circular perimeter around the through-space and having aligned with a diameter of the through-space oppositely extending slots along the surface of that face of the member, and extending about perpendicularly from the groove-containing edge a narrowed shaft portion continuous with a handle portion embodying interconnected convex screw driver head, Phillips screw driver head and a flat-faced screw driver head extending in different directions from one another in a common plane with the members opposite flat faces.

9 Claims, 5 Drawing Figures

PATENTED JUL 3 1973 3,742,533

MULTIPLE-USE TOOL

This invention relates to a tool of predetermined multiple-uses particularly in association with an aircraft maintenance.

BACKGROUND TO THE INVENTION

Prior to this invention in the servicing of an aircraft of particularly a military type, there has been a lack of appropriate tools for facilitating the efficiency and convenience of the aircraft mechanic, such as for example in the draining of water from aircraft gasoline tanks by the upward depression of drain valves normally of at least one of two different types. Also in the servicing of aircraft, there are frequently plates along the fuselage or wing structure which are designed to be removable by utilization of a convexly shaped screw driver flat head for quick release and quick fastening, in order to gain access to inner structures or the like. There are so many different type wrenches and screw drivers which are normally required such as Phillips screw drivers or flat headed screw drivers that it is difficult at all times to have the tool best suited to the job readily at hand and at best it is time consuming to continuously be shifting between different tools. Moreover a plurality of different tools are cumbersome as well as it being expensive to provide a separate set of tools for each operator or mechanic. With regard to the drainage of water from the bottom of aircraft gasoline tanks, the normal procedure in the past has been merely to press upwardly with the finger or hand of a mechanic in order for the mixture of water and gasoline to drain the water from the bottom of the tank, which results that the draining liquid runs down the hand and wrist and sleeve of the mechanic which is in cold weather not the most pleasant thing for the mechanic as well as the fact that in cold weather such a situation reduces the efficiency of the mechanic by causing the fingers and hands of the mechanic to become more cold than normally would be the situation in areas of low temperature. Additionally the continuous pressure required by the fingers or the hand pressing upwardly to depress the valve is especially tiring to the operator and accordingly the operator or mechanic is less likely to do a thorough drainage job of the moisture from the tank. Irrespective of the good intentions of the mechanic, the fingers or hand tend to slip off of the valve whereby it springs back into the closed position.

SUMMARY OF THE INVENTION

An object of this invention is to obtain a tool which overcomes one or more of the preceding difficulties and/or problems.

Another object is a tool designed to perform a multiplicity of functions.

Another object is a tool in which the shape thereof makes the tool suitable for multiple inter-related uses and functions.

Another object is a tool in which the shape of one portion thereof making the tool suitable for a particular purpose overlaps with the shape of the tool for another function whereby the tool shape has an inter-related purpose to it.

Other objects become apparent from the preceding and following disclosure.

One or more of the preceding objects are obtained by the invention as defined hereafter.

In particular the invention broadly relates to a water-drain valve-release tool suitable for different types of gas tank water-drain valves, as well as the shape for the multiple types of drain valves being inter-related with the function of the tool also for removing wing-nuts, while the handle making possible a firm grasp and maneuvering of the tool for these purposes is also utilizable as a Phillips screw driver, a flat-bladed screw driver and a concave-faced screw-lock screw driver of convex shape. Additionally, not only is the portion of the tool embodying the three screw drivers of a shape providing a good hand gripping handle, but the screw drivers are aligned and mounted between the opposite flat faces of a preferred embodiment of the tool to provide for grasping with the fingers or in the palm of a hand the body of the tool such that it may be pressed upwardly against the drain valve seated against a flattened periphery of the through-space permitting the drainage therethrough. Similarly, as a result of the preferred shape, the portion embodying the through-space and flat surface supports of the drain-valves and for the wing-nut removal also serves as a suitable grasping handle in utilizing the tool for the turning of the concave-faced screw-lock. Additionally, being that the Phillips screw driver head and axis thereof and the flat screw driver head and axis thereof are aligned along a common longitudinal axis with their respective longitudinal axes extending along the elongated portion of the handle structure, thereby the portion of the tool extending lateral thereto having the through-space and seat for the water-drain valves provides a portion for exerting leverage when utilizing either the Phillips screw driver head or the flat screw driver head, as well as providing sufficient body for easy grasping and applying of pressure in the hand of the operator. With the afore-noted advantages, there is the concurrent advantage of the tool being compact so as not to be cumbersome nor to require a great deal of storage room, readily being of a size transportable within the side pocket of the mechanic or operator.

THE FIGURES

DETAILED DESCRIPTION OF THE INVENTION

Figure 1:
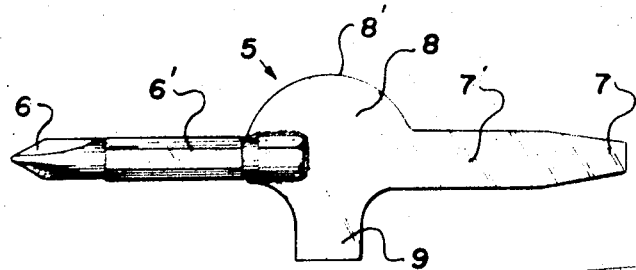
FIG. 1 illustrates typically a continuous metallic member which may be either cast in this form or welded together, illustrated in a side view.
Figure 2:
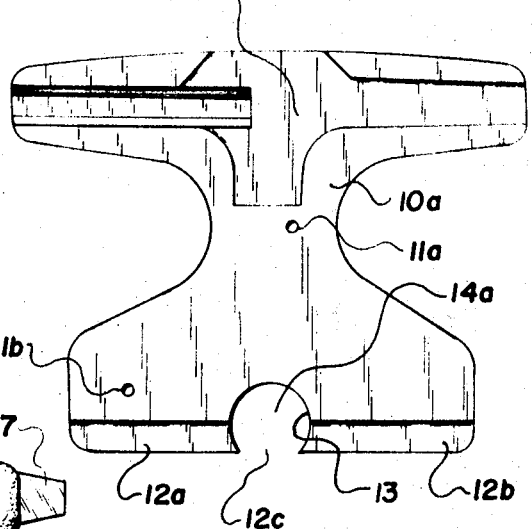
FIG. 2 illustrates typically in elevation plan view the inside of one-half of a two-halved member enclosable around the structure of FIG. 1.

With further reference to the Figures, FIG. 1 illustrates typically a molded steel screw driver element 5 having a Phillips screw driver head 6 and a flat screw driver head 7 extending along common axes 6' and 7' and having extending laterally therefrom a flat-faced screw driver member 8 having convex operative surface 8', the projection 9 serving the function of ascertaining that the shafts 6' and 7' will not twist within the member 10a of FIG. 2 which has a recess 10b for receiving the body of the shaft 6', 7' and 9.

The illustrated half-case of FIG. 2 typically illustrates pin 11a and 11b extending outwardly for mating with apertures in a matching enclosing half. Also viewable is the recessed portions 12a and 12b which in the completed member forms a slot 12 such as is illustrated in FIG. 4. Intermediate between the recessed portions 12a and 12b is an opening 12c which as illustrated in FIG. 4 is receivable of a male threaded shaft on which a wing nut may be mounted for the turning of the wing nut by the wings of the wing nut fitting within the groove 12 of the respective recessed portions 12a and 12b. Also viewable in FIG. 2 is the circular shaped structure 13 defining the through aperture 14a therein which when combined with the through aperture of the matching piece 10' forms the total through-space 14 illustrated in each of FIGS. 3 and 4.

Figure 3:
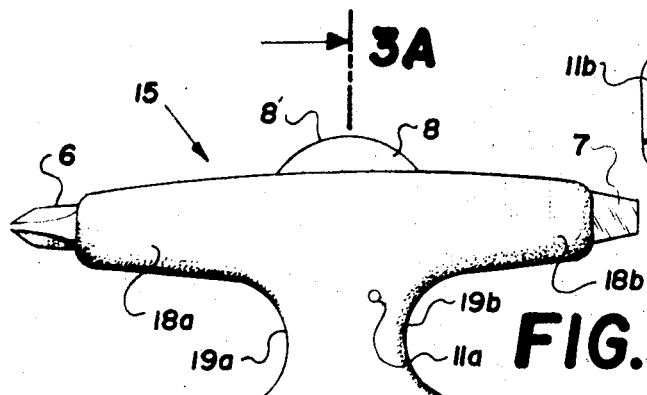
FIG. 3 illustrates the typical appearance of a preferred embodiment of a tool of this invention in elevation plan view, with the instruments of FIG. 1 mounted in the half of FIG. 2 with the final half enclosing the instrument as a whole.
Figure 4:
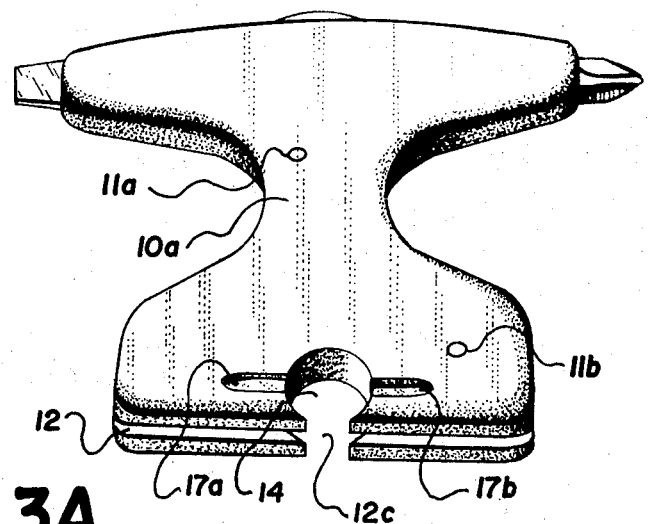
FIG. 4 illustrates in perspective view an opposite face of the instrument shown in FIG. 3.

FIG. 3 illustrates an elevation plan view of the entire assembled tool 15 illustrating a recessed shoulder 16 within a wider structure 13', a particular water-drain valve being of a diameter fittable within the diameter of the structure 13' and the flat face of the valve being seatable on the shoulder 16. Pins 11a and 11b are viewable in their inserted and securing positions through the body of the half-shell 10'.

The FIG. 4 perspective view embodiment illustrates in particular the oppositely extending grooves or depressions 17a and 17b along a common axis through the center of the through-space 14, being receivable of bar structures extending laterally from particular water-drainage valves for certain aircraft gasoline tanks, whereby the grooves 17a and 17b serve as seats therefor.

Figure 3A:
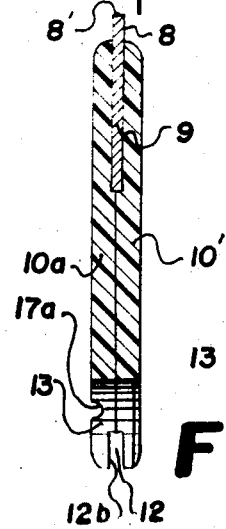
FIG. 3A illustrates a cross sectional view taken along lines 3A—3A of FIG. 3.

FIG. 3A illustrates in cross sectional view the relationship of the various parts such as 8, 8', 9, 10a, 10', and the aperture defining structures 13' and 13.

It is pointed out in particular that the space 12 through which the male-threaded shaft on which a wing nut might be mountable extends, blends in a preferred illustrated embodiment of FIGS. 1 through 4 with the through-space 14, making utilization of common space for different functions of the multi-purpose tool, as well as providing greater space for the unimpaired flowing of liquid being drained from a gas tank of an aircraft.

It should be noted that the particular shape illustrated is merely a preferred shape providing grasping surfaces 18a and 18b for the fingers as well as the flat surface of 10a being readily seatable within the palm of a hand. Similarly, when the Phillips screw driver head 6 or the flat headed screw driver 7 are either being utilized, the body portion 10'' provides a handle-structure for firm grasping as well as a leverage member for turning the screw driver head 6 or screw driver head 7. Similarly the body structure 10'' serves as a suitable handle structure with depressions 19a and 19b when utilizing the convex surface 8' of the screw driver head 8 to lock or unlock concave faced screw-lock screws.

It is clearly within the scope of the invention to vary the shape of the present instrument although the embodiments illustrated have the additional advantages recited above.

Similarly, other modifications and/or variations as would be apparent to a person of ordinary skill are within the scope of this invention.

I claim:

1. A tool device comprising in combination a member having a substantially first flat face defining a substantially circular through space passing therethrough, said through space having a predetermined diameter slightly less than that of the face of a water-drain valve of an aircraft gasoline tank, said member defining in at least one face thereof grooves extending in opposite directions from the edges of said through space and aligned with about said diameter.

2. The device of claim 1 in which said member includes a second flat face opposite from said first flat face, with said through space extending between and through each of said first and second flat faces, and with said grooves extending in opposite directions being in said second flat face.

3. The device of claim 2, in which said member includes a substantially flat faced edge structure having a predetermined thickness and said edge structure defining a slot extending in alignment with said edge structure, at least one portion of said slot being defined in sufficient depth and width to receive a male-threaded shaft on which a female-threaded wing-nut would be mountable, and said slot being of a predetermined width and depth sufficient to receive opposite wings of a wing-nut, the shaft-depth portion of said slot being central of oppositely-extending wing nut-receiving depth portions of said slot, said shaft-depth portion of said slot being continuous with said through space.

4. The device of claim 3, in which said member further defines a handle structure including a shaft portion extending from and about perpendicular to said slot-containing edge structure with an elongated hand-graspable shaft structure about vertical to said shaft portion and about parallel to said slot-containing edge structure and integral with said shaft portion.

5. The device of claim 4, including a Phillips screw driver head extending axially from one end of said shaft structure and a flat-bladed screw driver head extending axially from an opposite end of said shaft structure.

6. The device of claim 5, including extending intermediately between said Phillips screw driver head and said flat-bladed screw driver head and about perpendicular to said shaft structure and aligned about along the longitudinal axis of said axis portion a convex flat screw driver blade extending outwardly from said shaft structure, said member defining an opposite edge substantially opposite from said groove-containing edge, said convex screw driver blade extending outwardly from said opposite edge.

7. The device of claim 6 in which said Phillips screw driver head, said flat-bladed screw driver head and said convex screw driver head are intimately connected such that one offers non-rotating support for the other within said handle structure.

8. The device of claim 1, in which said member includes a substantially flat faced edge structure having a predetermined thickness and said edge structure defining a slot extending in alignment with said edge structure, at least one portion of said slot being defined in sufficient depth and width to receive a male-threaded shaft on which a female-threaded wing-nut would be mountable, and said slot being of a predetermined width and depth sufficient to receive opposite wings of a wing-nut, the shaft-depth portion of said slot being central of oppositely-extending wing nut-receiving depth portions of said slot, said shaft-depth portion of said slot being continuous with said through space.

9. The device of claim 1, in which in said first flat face circumscribing said through-space is a recessed shoulder receivable of said valve.

* * * * *